United States Patent
Suh

(10) Patent No.: US 6,714,364 B2
(45) Date of Patent: Mar. 30, 2004

(54) OPTICAL PICK-UP ACTUATOR

(75) Inventor: Min Suk Suh, Sung Nam (KR)

(73) Assignee: LG Electronics Inc., Seoul (KR)

( * ) Notice: Subject to any disclaimer, the term of this patent is extended or adjusted under 35 U.S.C. 154(b) by 321 days.

(21) Appl. No.: 09/825,382

(22) Filed: Apr. 3, 2001

(65) Prior Publication Data

US 2001/0026404 A1 Oct. 4, 2001

(30) Foreign Application Priority Data

Apr. 3, 2000 (KR) .......................................... 2000-17362

(51) Int. Cl.$^7$ .............................. G02B 7/02; G11B 7/00
(52) U.S. Cl. ........................ 359/813; 359/819; 359/822; 369/44.13; 369/44.15
(58) Field of Search ................................ 359/813, 819, 359/822, 823, 824, 814; 369/44.13, 44.15, 44.16, 44.17, 44.21, 44.22, 244

(56) References Cited

U.S. PATENT DOCUMENTS

| | | | | |
|---|---|---|---|---|
| 4,561,079 A | * | 12/1985 | Narumi | .................... 369/44.15 |
| 4,592,037 A | * | 5/1986 | Ohnuki | .................... 369/44.15 |
| 5,146,441 A | * | 9/1992 | Akiba et al. | .............. 369/44.15 |
| 5,182,739 A | * | 1/1993 | Kime et al. | ............... 369/44.15 |
| 6,501,710 B2 | * | 12/2002 | Yokoyama et al. | ....... 369/44.14 |
| 2002/0071358 A1 | * | 6/2002 | Kim et al. | ................ 369/44.16 |
| 2003/0016597 A1 | * | 1/2003 | Haruguchi et al. | ....... 369/44.16 |

FOREIGN PATENT DOCUMENTS

JP    P2001-56946    * 11/1999

* cited by examiner

Primary Examiner—Jordan M. Schwartz
Assistant Examiner—Timothy Thompson
(74) Attorney, Agent, or Firm—Lee, Hong, Degerman, Kang & Schmadeka

(57) ABSTRACT

An optical pick-up actuator of the present invention includes a lens holder having a objective lens and tracking and focusing coils, a frame for raising the lens holder in a magnetic field using a suspension wire, and a tilt driving magnetic circuit for driving the actuator in a third direction as well as focusing and tracking directions.

13 Claims, 3 Drawing Sheets

OPTICAL PICK-UP ACTUATOR

BACKGROUND OF THE INVENTION (a) Field of the Invention

The present invention relates to an optical pick-up device, and in particular, to an optical pickup actuator capable of controlling tilt for recoding information signals on a high density optical disc and reproducing the same therefrom.

(b) Description of the Related Art

Recently, as high density optical media have been developed, various optical pick-up devices have been researched and developed for recording information signals on the optical media and/or reproducing the signals therefrom.

The optical pick-up is a core part of optical recording/reproducing device. Information recorded on an optical disc is converted into optical signals in forms of laser beams generated by a laser diode installed in the optical pick-up. The optical signals are received by a lens of an actuator in the optical pick and then converted into electrical signals by an optical element.

The optical pickup actuator moves an objective lens with a bobbin so as to maintain relative position between the objective lens and the optical disc and write information into or read the same out of the optical disc along tracks defined on the disc.

The optical pick-up actuator moves the objective lens to a required position in accordance with cooperation between and magnets and coils arranged in a magnetic field formed by the magnets. The movable part is designed to be fixedly supported by a supporter (suspension wire) so as to obtain required frequency characteristics, can move in two directions, i.e., a focusing direction and a tracking direction, perpendicular to each other, and can be driven without unnecessary distortion such as rotation and twist for reducing optical signal errors.

In this conventional optical actuator, since the objective lens secured in a lens holder is driven up and down, and left and right directions for focusing and tracking operation, a driving device utilizes the Lorentz Force by Fleming's left-hand rule using a coil arranged in a magnetic field formed by a magnetic and a magnetic substance.

FIGS. 1A and 1B schematically shows a conventional optical pick-up actuator. As shown in FIGS. 1A and 1B, the conventional optical pick-up actuator includes a lens holder 102 securing an objective lens 101, a magnet 103, a yoke 104, a tracking coil 105, a focusing coil 106, a plurality of wire springs 107, a fixed print circuit board (PCB) 108, and a frame 109.

The objective lens 101 is seated at a center of the lens holder 102 and the lens holder 102 is movably arranged with a plurality of wire springs 107. The lens holder 102 secures the objective lens 101 at the center thereof and is wound by the focusing coil 106, and then a previously wound tracking coils 105 are mount around the lens holder 102 over focusing coil 106. Next, the PCBs 108 is fixed on both sides of the lens holder 102 and a pair of yokes 104 are arranged so as to face each other. On an outer surface of each yoke 104, a magnet 104 is fixed.

Also, the yoke 104 is integrally formed with a pick-up base and (not shown) through a hole by an integral member.

On one side of the optical pick-up actuator, a frame 109 is arranged such that a main PCB is fixed thereto using a bolt (not shown), and a plurality of wire springs are connected to the main frame 109. The wire springs 107 are connected to the fixed PCB 108 such that the lens holder 102 is suspended by the wire springs 107.

In the above structured optical pick-up actuator, if an electric current flows along the focusing coil 106, an electromotive force is generated such that the electromotive force can drive the movable part (lens holder assembly) in upward and downward directions. Identically, if the electric current flows along the tracking coil 105, an electromotive force is generated such that the electromotive force can drive the movable part in left and right directions (tracking directions).

By tracking and focusing controls of the optical pick-up actuator, the pick-up actuator maintains focusing depth of the laser beam projected from the objective lens 101 so as to read information pits on the optical disc and moves along the tracks formed on the optical disc.

However, this conventional pick-up mechanism is inappropriate for controlling the recording/reproducing operation if the data storing volume of the disc increases. The increase of storing volume means that the data recorded along each track increases such that the number of the tracks of the optical disc increase.

That is, in conventional low density optical disc, it is possible to successively read or write information signals by controlling movement of the optical pick-up and optical lens of the actuator. In the high density optical disc; however, the track width is narrow such that the conventional control method can not be used for tracking and focusing the disc.

SUMMARY OF THE INVENTION

The present invention has been made in an effort to solve the above problems of the prior art.

It is an object of the present invention to provide an optical actuator capable of controlling tilt necessary for read information signals from a high density optical disc and write the information signals on the disc.

To achieve the above object, the optical pick-up actuator of the present invention comprises a lens holder surrounding an objective lens, a pair of tracking coils, and a pair of focusing coils; a frame for suspending the lens holder in a magnetic field using suspension wires; and a pair of tilt driving magnetic circuit for driving the actuator in a third direction but not focusing and tracking directions. The optical pick-up actuator can tilt the frame in a magnetic field by the tilt driving magnetic circuit so as to tilt the lens holder connected to the frame via the suspension wire.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An optical pick-up actuator comprises a lens holder having a objective lens and tracking and focusing coils; a frame which is connected to a predetermined fixed end portion through a shaft and has a suspension means for supporting said lens holder; and a magnetic circuit for tilting motion which drives said lens holder in a predetermined direction other than focusing and tracking directions.

An optical pick-up actuator comprises a lens holder suspended in a magnetic field by a suspension wire and having tracking and focusing coils and objective lens; a frame which is connected to a predetermined fixed end portion through a shaft and has a suspension means for supporting said lens holder; and a magnetic circuit for tilting motion comprised of a coil means for tilting motion mounted at both end portion of said frame and a magnet means cooperatively provided with said coil means for tilting motion thereby bending and twisting said shaft.

In the present invention, wherein said magnetic circuit for tilting motion generates an magnetic field independent from that of the magnetic circuit for tracking and focusing and drives said lens holder in said predetermined direction other than the focusing and tracking directions by driving said frame.

In the present invention, wherein said frame is driven in magnetic fields for tilt motion such that said lens holder is driven in a predetermined direction.

In the present invention, wherein said magnetic circuit for tilting motion is provided with pairs of coil and magnet means for generating a magnetic fields such that said frame is driven in said predetermined direction according to the electric currents flowing along said coil means.

In the present invention, wherein said frame is driven in tilt motion through said shaft.

In the present invention, wherein said shaft is supported by a bearing means.

In the present invention, wherein said shaft is made of a rigid material.

In the present invention, wherein said predetermined end portion is a yoke.

In the present invention, wherein said tilt motion occurs in radial and/or tangential direction(s).

In the present invention, wherein said frame is elastically supported onto a damper means made of rubber material.

A preferred embodiment of the present invention will be described hereinafter with reference to the accompanying drawings.

Figure 1A:
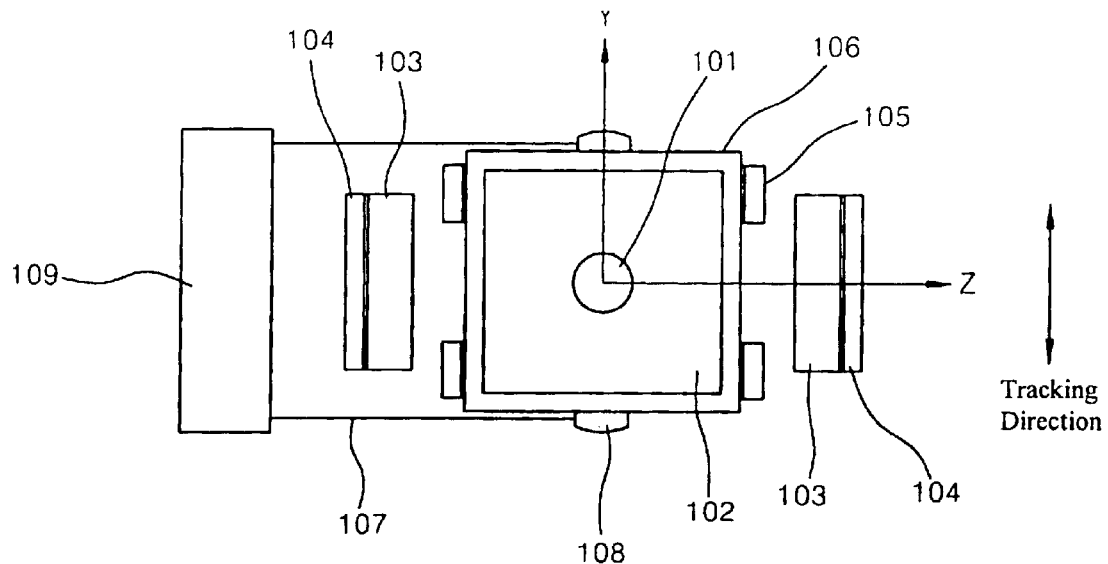
FIG. 1A is a plane view illustrating a conventional optical pick-up actuator.
Figure 1B:
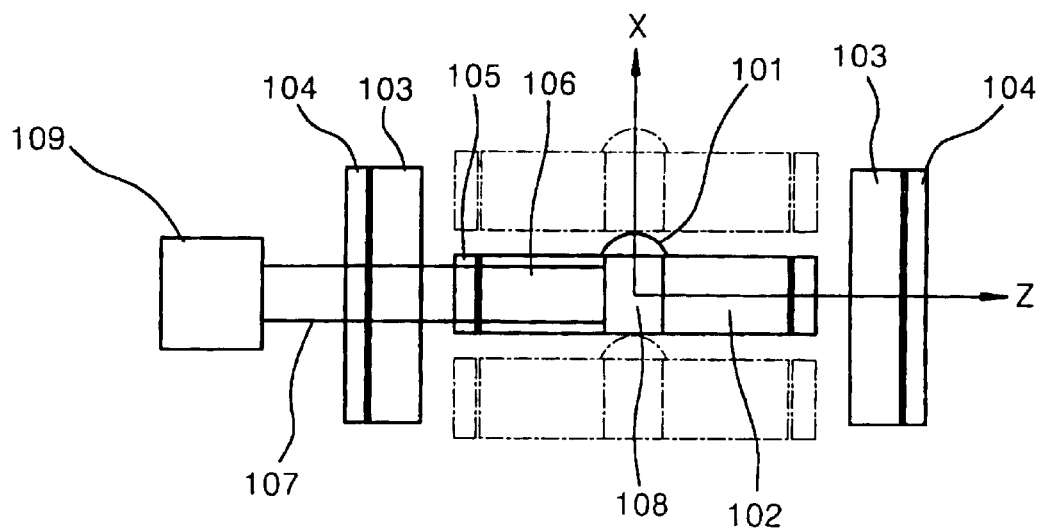
FIG. 1B is a front view of the optical pick-up actuator of FIG. 1B.
Figure 2:
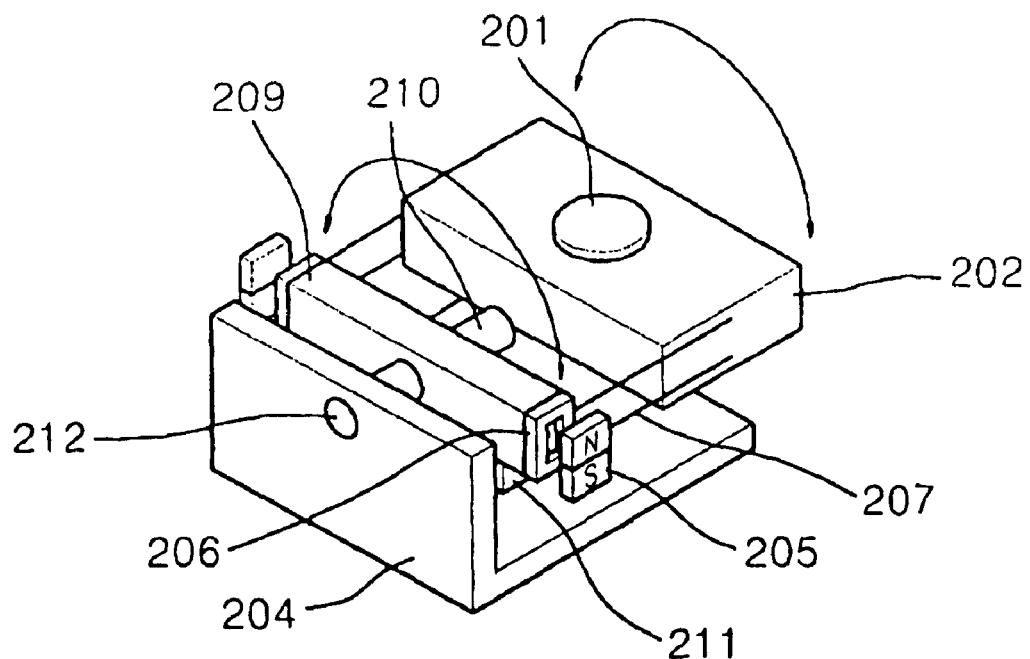
FIG. 2 is a perspective view illustrating an optical pick-up actuator according to a preferred embodiment of the present invention.

FIG. 2 shows the optical pick-up actuator of the present invention. As shown in FIG. 2, the optical actuator comprises a lens holder 202 having an objective lens 201 suspended on the frame 209 by wire springs 207, the lens holder 202 having tracking and focusing coils (not shown), magnets (not shown) for generating for tracking and focusing magnetic fields, a yoke 204 for supporting the frame 209 by a shaft 210, the yoke 204 being provided with a bearing 212 so as to cause the shaft 210 to smoothly rotate, a pair of coils 206 mounted at both sides of the frame 209 for tilt driving, a pair of tilt driving magnets 205 mounted so as to face the tilt control coils 206, and a pair of rubbers 211 arranged at lower portion of the frame 209.

The tilt control coil 206 and magnet 205 form a magnetic circuit for tilting movement and the shaft acts as an axis so as to drive the frame in a third direction relative to the focusing and tracking directions. The shaft is made of a rigid material and supported by the bearing 212 so as to secure a smooth rotation. The frame 209 supported by the shaft 210 can tilt in radial or tangential direction.

The rubbers 211 act as cushion or damper when the shaft 210 rotates with being supporting by the bearing 212 of the yoke 204 such that a stable servo control can be achieved and prevent the shaft 210 from being separated in axial direction of the shaft 210.

If the electric current flows along the focusing coil which is positioned in the magnetic field formed by the tracking and focusing magnets, the focusing coils generate electromotive forces such that the electromotive force moves the movable part (lens holder assembly) in upward and downward directions (focusing directions). In the same manner, if the electric current flows along the tracking coils, the movable part moves in left and right directions (tracking directions).

Figure 3:
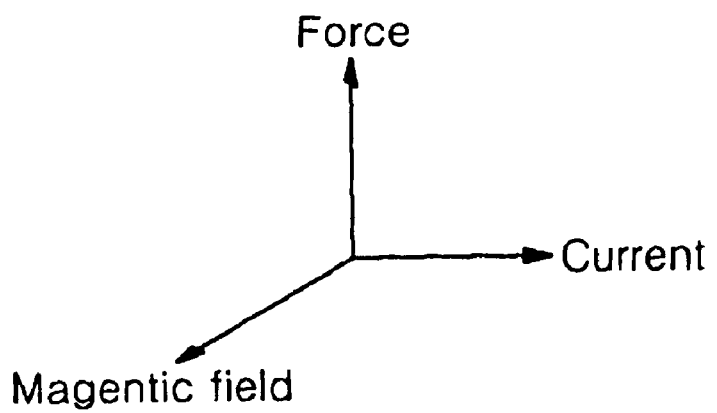
FIG. 3 is a dimensional view illustrating the Lorentz Force.

FIG. 3 is a dimensional view illustrating the Lorentz Force for explaining directions of electromotive force when a current flows along a conductor in a magnetic field. That is, if a coil is arranged in an electric field and electric current flows along the coil, an electromotive force is generated in a predetermined direction.

The optical actuator of the present invention performs the tilt control using a relative current-magnetic field operation with the magnets 205 facing the tilt control coils 206 fixed at both ends of the frame 209 that pivotally supported by the yoke 204 with the shaft 209 for using the Lorentz Force.

Figure 4:
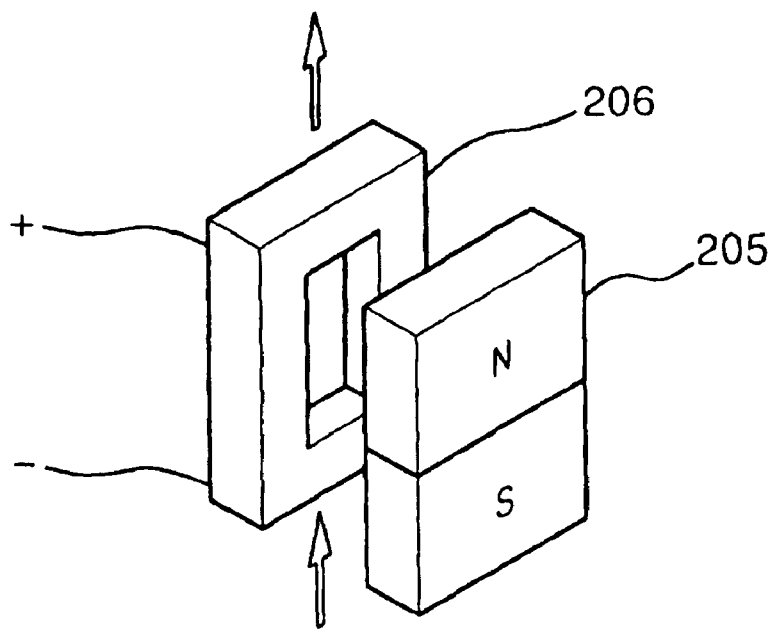
FIG. 4 is a drawing illustrating a movement of the a coil according to the Lorentz Force of FIG. 3.

FIG. 4 is a drawing illustrating a movement of the coil according to the direction of the electric current. The electric current flows a direction shown in FIG. 4, along the tilt control coil 206 facing the magnet 205, the electromotive force is generated in the same direction at the upper and lower portion of the coil. Accordingly, the frame 209 rotates on the axis of the shaft 210.

Figure 5:
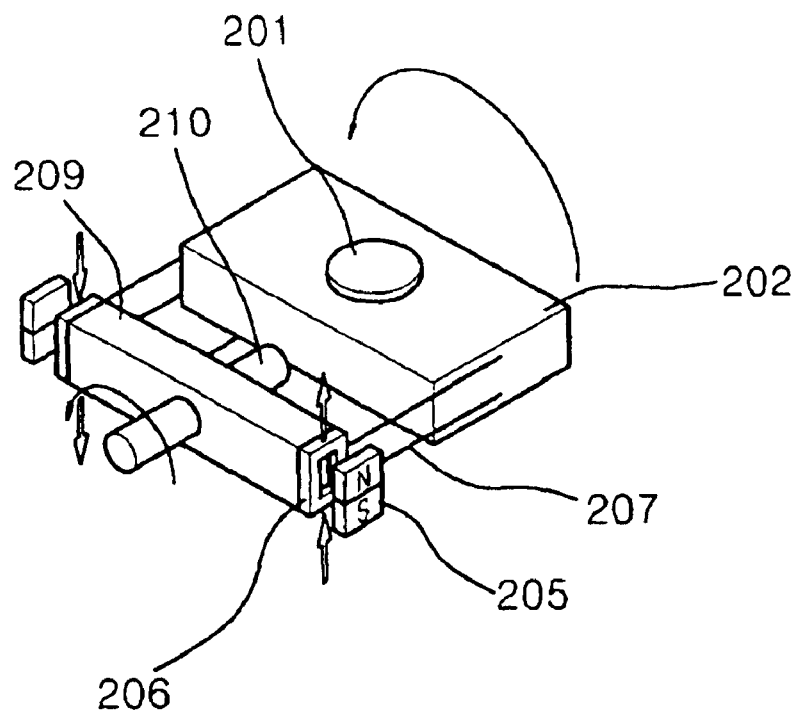
FIG. 5 is a perspective view illustrating a tilt mechanism of the optical pick-up of the present invention.

FIG. 5 is a perspective view illustrating a tilt mechanism of the optical pick-up of the present invention. As shown in FIG. 5, if electric currents flow in different directions on the two coil 206 mounted at both end of the frame 209, an electric current is generated in the magnetic field formed by the magnet 205 such that the frame 209 tilts on the axis of the shaft 210 because the frame experience the electromotive forces in different directions at both end thereof.

That is, if the frame rotates on the axis of the shaft 210, the lens holder 202 suspended from the frame 209 by the wire springs tilts in the radial or tangential directions. Accordingly, the objective lens 201 seated in the lens holder 202 can be precisely positioned at a required location so as to read or write information signals on the disc by compensating the tilt.

As describe above, since the optical pick-up actuator of the present invention is provided with tilt control mechanism using the magnets and coils added to the actuator frame without structural change of the lens holder, it is possible to control the radial or tangential direction tilt as well as tracking and focusing controls in the optical recording and reproducing device.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An optical pick-up actuator comprising:
   a lens holder for housing an objective lens;
   a tracking system for moving the lens holder in a first plane;
   a focusing system for moving the lens holder in a second plane approximately perpendicular to the first plane;
   an elongated frame having first and second opposite ends, said frame comprising a support means connected to said first and second opposite ends for supporting said lens holder in a first suspended state with respect to the first plane; and
   a magnetic system in operational relationship with the first and second opposite ends of the frame, such that the magnetic system generates a magnetic field and at least the first end of the frame moves within the magnetic field to cause the frame to rotate about an elongated shaft running through the frame's first axis positioned between said first and second opposite ends of the frame, causing the support means to rotate the lens holder about the first axis to a second suspended state with respect to the first plane.

2. The optical pick-up actuator of claim 1, wherein said magnetic system comprises first and second magnets such that in the first suspended state, each of said first and second magnets is respectively disposed opposite said first and second ends of the frame to generate the magnetic field, the optical pick-up actuator further comprising:
   at least one of a first coil disposed at the first end of the frame; and
   a second coil disposed at the second end of the frame;
   wherein said at least one of the first and the second coils when exposed to a current move within said magnetic field, in response to an applied electromotive force, thereby causing the frame to rotate about the shaft positioned along the first axis.

3. The optical pick-up actuator of claim 1, wherein said frame is attached to a yoke via the elongated shaft.

4. The optical pick-up actuator of claim 1, wherein said magnetic system comprises at least one coil attached to an end of the frame and one magnet for generating the magnetic field such that said frame rotates in a first direction about the shaft positioned along the first axis in response to an electric current flowing in said coil, in a first direction.

5. The optical pick-up actuator of claim 4, wherein the frame rotates in a second direction about the shaft in response to the electric current flowing in said coil, in a second direction.

6. The optical pick-up actuator of claim 1, wherein said shaft is supported by a bearing as it runs through the frame's first axis.

7. The optical pick-up actuator of claim 1, wherein said shaft is made of a rigid material.

8. The optical pick-up actuator of claim 1, wherein the support means comprises a plurality of biasing members to allow for flexible support of the lens holder in a suspended state.

9. The optical pick-up actuator of claim 1, further comprising a second rotating means for rotating the lens holder about a second axis approximately perpendicular to the first axis.

10. The optical pick-up actuator of claim 1, wherein said frame is elastically supported by a damper means.

11. An optical pick-up system comprising:
    a lens holder for housing an objective lens;
    a vertical and horizontal moving system for moving the lens holder in first and second planes, wherein said first and second planes are approximately perpendicular;
    a frame having first and second opposite ends;
    first and second supportive braces, each respectively extending from first and second opposite ends of the frame for supporting said lens holder in a first suspended state with respect to the first plane, and
    an electromagnetic mechanism comprising:
      first and second coils, respectively connected to said first and second opposite ends of the frame; and
      first and second magnets respectively located opposite said first and second coils;
    wherein the first and second magnets generates at least a magnetic field to interact with a current flowing in said first and second coils such that an electromagnetic force is generated as a result of said interaction to move said first and second ends of the frame within the magnetic field and wherein the electromagnetic force is translated into a rotational movement upon acting on the first and second ends of the frame to cause the frame to rotate about an elongated shaft running through the frame's first axis positioned between said first and second opposite ends of the frame.

12. The optical pick-up system of claim 11, wherein the rotational movement of the frame is translated to the lens holder via the first and second supportive braces to rotate the lens holder about the first axis to a second suspended state with respect to the first plane.

13. The optical pick-up system of claim 11, wherein said frame is attached to a yoke via the elongated shaft.

* * * * *